(12) United States Patent
Fazeny (10) Patent No.: US 7,652,225 B2
(45) Date of Patent: Jan. 26, 2010

(54) METHOD AND DEVICE FOR MACHINING COMPOSITE PARTS FORMED FROM A CARRIER DEVICE AND A STAMPING PAD

(75) Inventor: Stephan Fazeny, Gmunden (AT)

(73) Assignee: Trotec Produktions U. Vertriebs GmbH (AT)

( * ) Notice: Subject to any disclaimer, the term of this patent is extended or adjusted under 35 U.S.C. 154(b) by 475 days.

(21) Appl. No.: 10/550,249

(22) PCT Filed: Mar. 2, 2004

(86) PCT No.: PCT/AT2004/000061

§ 371 (c)(1),
(2), (4) Date: Sep. 23, 2005

(87) PCT Pub. No.: WO2004/085110

PCT Pub. Date: Oct. 7, 2004

(65) Prior Publication Data

US 2006/0196326 A1 Sep. 7, 2006

(30) Foreign Application Priority Data

Mar. 26, 2003 (AT) ................................ A 479/2003

(51) Int. Cl.
*B23K 26/38* (2006.01)
(52) U.S. Cl. ................................. 219/121.72
(58) Field of Classification Search ............ 219/121.68, 219/121.69, 121.67, 121.72; 101/327; 700/166; 264/400
See application file for complete search history.

(56) References Cited

U.S. PATENT DOCUMENTS

| 3,009,440 | A | | 11/1961 | Kent | |
| 4,900,379 | A | * | 2/1990 | Chapman | 156/64 |
| 5,003,153 | A | * | 3/1991 | Kondo | 219/121.68 |
| 5,132,510 | A | * | 7/1992 | Klingel et al. | 700/166 |
| 5,460,757 | A | * | 10/1995 | Hedgecoth | 219/121.69 |
| 5,601,644 | A | * | 2/1997 | Yasoshima | 101/327 |
| 6,423,931 | B1 | | 7/2002 | Penz et al. | |
| 6,491,361 | B1 | * | 12/2002 | Spann | 219/121.67 |
| 6,908,243 | B1 | * | 6/2005 | Lai | 400/621 |
| 2002/0002416 | A1 | * | 1/2002 | Herman, Jr. | 700/135 |
| 2006/0266239 | A1 | * | 11/2006 | Yip | 101/327 |

FOREIGN PATENT DOCUMENTS

| FR | 2675740 | A | * | 10/1992 |
| JP | 7 032 226 | A | | 3/1995 |
| JP | 9-30097 | A | * | 2/1997 |
| JP | 10-193635 | A | * | 7/1998 |
| JP | 10-270843 | A | * | 10/1998 |
| JP | 2001-205911 | A | * | 7/2001 |
| JP | 2002-248783 | A | * | 9/2002 |
| SU | 1689473 | A1 | * | 11/1991 |

* cited by examiner

*Primary Examiner*—Geoffrey S Evans
(74) *Attorney, Agent, or Firm*—Lerner, David, Littenberg, Krumholz & Mentlik, LLP (57) ABSTRACT

A processing device for processing a composite component with at least a support device and a stamp pad having at least one operating head of a material-removing unit. The material-removing unit and the composite component are moved relative to one another by means of a handling unit controlled by a control unit whereby material is removed from the composite component. The stamp pad of the composite component is divided into several mutually spaced pad parts by means of a dividing gap, whereby the operating head together with a dispensing unit of an ink dispenser unit is incorporated in an effector unit.

24 Claims, 6 Drawing Sheets

METHOD AND DEVICE FOR MACHINING COMPOSITE PARTS FORMED FROM A CARRIER DEVICE AND A STAMPING PAD

CROSS REFERENCE TO RELATED APPLICATIONS

Applicant claims priority under 35 U.S.C. §119 of Austrian Application No. A 479/2003 filed Mar. 26, 2003. Applicant also claims priority under 35 U.S.C. §365 of PCT/AT2004/000061 filed Mar. 2, 2004. The international application under PCT article 21(2) was not published in English.

The invention relates to a method of processing, by machine, composite components comprising at least a support mechanism and a stamp pad by means of a processing device, whereby, in order to process the composite component, at least one processing head of a material-removing unit and the composite component are moved relative to one another by means of a handling unit which is controlled and/or regulated by a control unit, in particular in an XY plane, and material is removed from the composite component by means of the material-removing unit, as well as a processing device, comprising at least a material-removing unit and a handling unit, whereby at least one processing head of the material-removing unit can be adjusted, in particular displaced, in an XY plane, and the handling unit is and/or can be connected to a control unit for control and/or regulation purposes.

Multi-coloured, in particular two-coloured, stamp pads with support devices, in particular stamp pad holders, and a method of manufacturing them are already known from the prior art, whereby differently coloured stamp pads are disposed separately from one another in a fluid-tight arrangement in the support device by means of dividing webs. With a structure of this type, the support device has to be provided with dividing webs during manufacture in order to accommodate differently coloured stamp pads, after which fixed sizes and shapes of stamp pad parts have to be inserted in the support device, thereby resulting in a composite component. When using such stamp pads, preferably in self-inking stamps, it is possible to make multi-coloured stamp prints, and the intended colour separation of the different stamp pad parts, determined by the dividing webs made when manufacturing the stamp pad holders, are such that only fixed regions of the stamp plate print in different colours. The disadvantage of stamp pads known from the prior art is that they can not be individually adapted to the specific requirements of users in terms of a coloured design of stamp prints because only specific pre-defined regions are suitable for producing differently coloured print and these regions can not be determined by a user, for example in order to impart colour to specific characters. What has also not been possible with the prior art to date is to be able to manufacture multi-coloured stamp pads and stamp plates for use in self-inking stamps on an automated basis.

The objective of the invention is to propose a method and a device, whereby at least composite components consisting of a stamp pad and a support device can be made by a simple and flexible manufacturing process. Another partial objective of the invention is to manufacture individual composite components for use with a stamp device.

This objective is achieved by the invention, independently in each case, due to the fact that, because of the material-removing unit, the stamp pad of the composite component, which is at least partially connected to the support device, is divided into several mutually spaced pad parts by means of a dividing gap. The advantage of this is that an individual and flexible form of the pad parts can be produced due to the fact that the stamp pad is divided, because the control unit is able to define the region of the stamp pad to be removed. Another advantage is that a standard composite component comprising a stamp pad and a support device, in particular a stamp pad holder incorporating a single continuous stamp pad, can be prepared by machine processing in such a way that different pad parts are able to accommodate stamping inks of different and/or the same type, and these different pad parts can be defined in terms of their number and/or extension or shape by defining one or more removal regions, in particular cutting lines.

Another advantage is obtained due to the fact that at least one cutting line on the composite component is set by the control unit, in particular on a processing surface, and the stamp pad is divided into the pad parts along the cutting line so that pad parts to be inked can be produced precisely and on an automated basis in virtually any shape.

In view of the fact that material is removed continuously from a thickness of the stamp pad along the cutting line in order to form the dividing gap, so that the pad parts are not connected to one another, a complete separation of the pad parts is advantageously obtained and what was initially an integral pad is completely cut through its thickness along a cutting line in spite of being mounted in the support device and is thus separate from other pad parts.

Another particular advantage is the fact that, after the stamp pad has been cut into several pad parts, the latter are provided with stamping ink; by means of an ink dispensing device of the processing unit, the different pad parts are provided with stamping ink or inking fluids; the pad parts are provided with different and/or the same stamping inks, in particular stamping inks of different and/or the same colours, resulting in a multi-coloured stamp pad suitable for producing multi-coloured stamp prints using a stamping device, and coloured stamp prints can be produced in virtually any shape or colour combination specifically to the requirements of a user.

Another advantage is the fact that several different, in particular differently coloured, stamping inks can be mixed and other types or colours of stamping inks can be produced for applying to the pad parts, in particular from the palette of RGB or CMYK colours, thereby enabling a plurality of different colours to be created and applied to the stamp pad, which increases the quality and individuality of stamp prints.

The advantage gained due to the fact that ink is dispensed by the ink dispensing device in the form of liquid drops which are dripped through one or more outlet orifices in the direction of an ink application point on one of the pad parts is that the outlet orifice provided as a means of applying the stamping ink merely has to be positioned at an ink dispensing point above it and the pad parts are provided with one or more drops of ink, either by force of gravity or by applying force, in particular pressure, thereby enabling a quantity of ink to be stored by the pad part to be dispensed accordingly, depending on the number of drops to be applied.

Different types of stamping inks for the different pad parts can be dispensed respectively by means of different outlet orifices, each of which has a flow connection to separate housing chambers for stamping ink and/or different stamping inks for the different pad parts are dispensed through one outlet orifice which can be connected to different housing chambers for stamping ink, the advantage of which is that every outlet orifice is assigned a special type of stamping ink and no unintentional admixing of different colour types of stamping inks is possible and/or the fact that only one outlet orifice is provided saves on space and an appropriate approach is provided as a means of mixing colours based on different types of stamping inks to produce other colours.

In one method step, several ink application points on the pad top faces are fixed or pre-set by the control unit, in particular in a grid pattern; at least the outlet orifice, in particular an outlet nozzle, of the ink dispensing unit is positioned in order to dispense ink to the different ink applications points, preferably at the grid points; and ink is applied by pulsing in the form of one or more ink drops to the ink application points, the advantage of which is that it is possible to supply the pad parts uniformly with stamping ink, so that approximately the same quantity of ink is stored in the different regions of the stamp pad and a uniform quantity of ink can therefore be dispensed at the pad top faces and along it when the stamp plate makes contact.

When additional pressure is briefly applied, in particular a pressure surge, at least in the region of the outlet orifice, preferably in the ink containers, the stamping ink is dispensed by an ejection of fluid from the outlet orifice, the advantage of which is that by briefly applying additional pressure and due to the intensity or duration thereof, the quantity of ejected ink, in particular the ink drops, can be controlled or regulated and an inexpensive pressure generator which is easy to control can be used.

Due to the fact that the outlet orifice is sealed by means of a shut-off mechanism, in particular a check valve, which is preferably disposed in the closed position in the normal state but can be switched into an open position by applying force, thereby preventing ink from being inadvertently dispensed, a fluid passage is advantageously closed, thereby preventing stamping ink disposed in the region of the outlet orifice from dripping undesirably through the outlet orifices.

By adopting an approach whereby the at least one effector unit, which preferably comprises at least one dispensing unit of the ink dispenser unit and the operating head of the material removing unit, is displaced and positioned by the handling unit, a compact arrangement is advantageously possible as well as a simple means of controlling only the actuator means for operating the composite component and other workpieces.

Surface part regions are and/or can be set on the processing surface of the composite component, in particular the stamp pad, by the control unit and the stamp pad is cut into the individual pad parts on the basis of these surface part region; the control unit sets the cutting line between adjoining surface part regions along which at least the material-removing unit is displaced by the handling unit. The advantage of this is that the cutting lines for dividing the stamp pad into the pad parts are automatically determined by the control unit, after which the cut is made by displacing the material-removing unit, which is in the active state, along this cutting line.

Another advantage is the fact that the support device for the stamp pad and the pad parts is scored on a base plate simultaneously with the process of cutting the stamp pad by the material-removing unit along the cutting line and/ or is partially cut at the retaining projections in the region of the processing surface, which means that the pad parts are also completely cut in the region of the retaining projections partially engaging round the pad part top face and because a score is made in the support device in the region of the base plate, a recess with a short depth and a rib are formed if necessary, thereby making it more difficult for fluid to get onto the base surface between the pad parts.

Another advantage is the fact that the handling unit is controlled by mans of the control unit so that the effector unit or individual components of the effector unit are displaced and positioned in an XY plane, in particular in a Cartesian system of co-ordinates based on two co-ordinates, as a result of which the outlet orifices of the ink applicator units and/or the actuator means of the material-removing unit can be freely positioned in order to process the composite component in the XY plane and can be displaced along a path or a track, in particular by means of a co-ordinates-point controller.

An input and/or output device co-operating with the control unit is used to set the surface part regions; a stamp surface of a stamp plate can be displayed on the input and/or output device, in particular a computer unit, such as a personal computer for example, and several plate regions are assigned to the stamp plate on the stamp surface by means of the input and/or output device; the plate regions are assigned by fixing several engraved patterns, for example characters, to be made or applied on the stamp plate; depending on the number and shape of the plate regions or engraved patterns, the surface part region or cutting lines on the stamp pad are set by the control unit for cutting the stamp pad. The advantage of this is that a user can specify to his own requirements the regional breakdown of the pad parts to be produced by means of the input and/or output device, because stamp plate regions can be set which come into contact with corresponding pad parts when used as intended in self-inking stamps in order to apply ink to the corresponding characters or engraved patterns, and a division of the stamp pads into pad parts or surface part regions can be set up on the basis of the shape and set colour of the stamp plates regions from the input and/or output device, so that the engraved patterns on the stamp plate are able to co-operate accordingly with the pad parts in a stamp during use, enabling differently coloured stamp prints to be produced by means of the different engraved patterns on the stamp plate.

It is also of advantage if the control and/or automatic control procedures or computing routines of the control unit, for example setting of the cutting lines or surface part regions, control of the handling unit, etc., are handled on the basis of software; once the plate regions or engraved patterns have been set up at the input and/or output device using the software, the division into regions or cutting lines in order to produce the pad parts and/or stamp plate takes place automatically, which means that an automated and intelligent production sequence can be set up for the processing device and, in conjunction with a computer unit, in particular a personal computer, a fully automated production process including an engraving process of the stamp plate and inking of the different pad parts can be initiated on the basis of fixed stamp plates or surface part regions set up by an operator, requiring nothing more than the processing device proposed by the invention.

In one advantageous embodiment, material is removed by the material-removing unit by radiation from a radiation source, in particular a laser beam of a laser system, thereby enabling the stamp pad to be cut with virtually no left-over material whilst producing a narrow dividing gap and an exact cut contour.

The objective of the invention is also achieved, independently, due to the fact that the processing device has an ink dispenser unit for dispensing stamping ink as necessary, in particular inking fluids. The advantage of this is that stamp ink can be applied by means of the ink dispenser unit to different pad parts, which can be produced by the material-removing unit and the handling unit, which means that a composite component for self-inking stamps capable of producing multi-coloured stamp prints can be produced easily.

It is of advantage if the handling unit is designed to displace at least one outlet orifice of the ink dispenser unit and the workpiece holder relative to one another, thereby enabling ink to be applied to the pad parts uniformly.

Due to the fact that the ink dispenser unit has a dispensing unit with a dispenser nozzle for stamping ink and constituting an effector unit co-operating with the handling unit, at least the dispensing unit of the dispenser unit and/or the operating head of the material-removing unit co-operate with it and are preferably disposed on a retaining unit of the effector unit and coupled therewith in displacement and the effector unit, in particular the retaining unit, is designed so that it can be positioned by the handling unit, thereby advantageously providing a unit which can be displaced and positioned with nothing more than the actuator elements of the operating head and the dispensing unit by providing an effector unit on the retaining unit designed to run a material-removing process and apply ink to the composite component, and the entire effector unit together with the actuator means for processing the composite component can be moved by the handling unit, preferably in an XY plane.

It is also of advantage if the ink dispenser unit has at least one outlet orifice defined by boundary surfaces for dispensing stamping ink and the outlet orifice is provided on the dispenser nozzle and the outlet orifice has a flow connection to at least one housing chamber for the stamping ink, in particular an ink container, because this enables stamping ink to be dispensed onto the pad parts at ink application points, in which case it is also of advantage if the at least one ink container is disposed next to a production system, preferably so as to be stationary, and preferably has a flow connection to at least one fluid line, which means that only the dispenser nozzle incorporating the outlet orifice has to be disposed on the effector unit, and the dispensing unit is formed by a coupling element for accommodating the dispenser nozzle and liquid lines to establish a flow connection between an ink container and the outlet orifice, resulting in a compact operating unit which can be displaced by the effector, because the bulky and heavy ink container or containers are secured to the processing device in a stationary manner and do not have to be moved or positioned by the effector unit.

The ink dispenser unit may also have several dispenser nozzles with outlet orifices and the one or more outlet orifices of the dispenser nozzles each have a flow connection to a flow passage in fluid lines for stamping ink, thereby forming an ink delivery system for every stamping ink so that any unintentional admixing of residues of another type of stamping ink with stamping inks to be applied is prevented.

Since the ink dispenser unit has a metering unit for controlling the stamping ink dispensed and the metering unit is provided in the form of a pressure generator which is actively connected to the ink delivery system, in particular the ink containers and/or the fluid lines and/or the dispensing passage, at least in the region of the outlet orifice, the pressure generator merely has to be briefly activated in order to place the ink delivery system at over pressure to enable ink to be dispensed via the outlet orifice.

By providing a shut-off device, in particular a check valve, in the region of the outlet orifice in the ink delivery system, in particular the outlet nozzle or the fluid line, the outlet orifice can be prevented from unintentionally dispensing stamping ink because the ink delivery system has a liquid-tight closure or seal, preferably in the region of the outlet orifice.

The fact that a housing chamber of an outlet nozzle has a flow connection or a flow connection can be established with several ink delivery systems, means that it is possible to provide only one dispenser nozzle, for example, which has a flow connection to housing chambers of fluid containers in which different types of stamping ink can be stored, thereby enabling admixing of different proportions of different types of stamping inks as necessary to produce colour blends, for example colours from the RGB or CMYK colour palettes.

It is of advantage if the handling unit has a guide system and a drive mechanism for displacing and positioning the effector unit, in which case the drive mechanism is actively connected to the control unit for control and/or automatic control purposes and the drive mechanism is provided as a means of displacing and moving the support arm and/or the retaining unit of the effector unit as and when necessary by means of the guide system, thereby resulting in a simple and precise means of positioning and displacing the effector unit.

Due to the fact that the control unit has a memory unit in which software means are stored and the control unit is provided in the form of a computer unit, in particular a personal computer, connected via an interface to the processing device, in particular the material-removing unit and/or the handling unit and/or the ink delivery system, data and parameters for further processing by the control unit can advantageously be entered in a simple and user-friendly manner by means of a computer unit, and processing of the composite component can be essentially fully automated on the basis of the processing steps controlled by the software means.

That fact that a radiation source, in particular a laser system, is used as the material-removing unit means that an exactly controllable, precise material-removing process can be run without any residual material, whereby only the stamp pad and not the support device is completely severed.

To provide a clearer understanding, the invention will be described in more detail below with reference to examples of embodiments schematically illustrated in the appended drawings on a simplified basis.

Of these.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
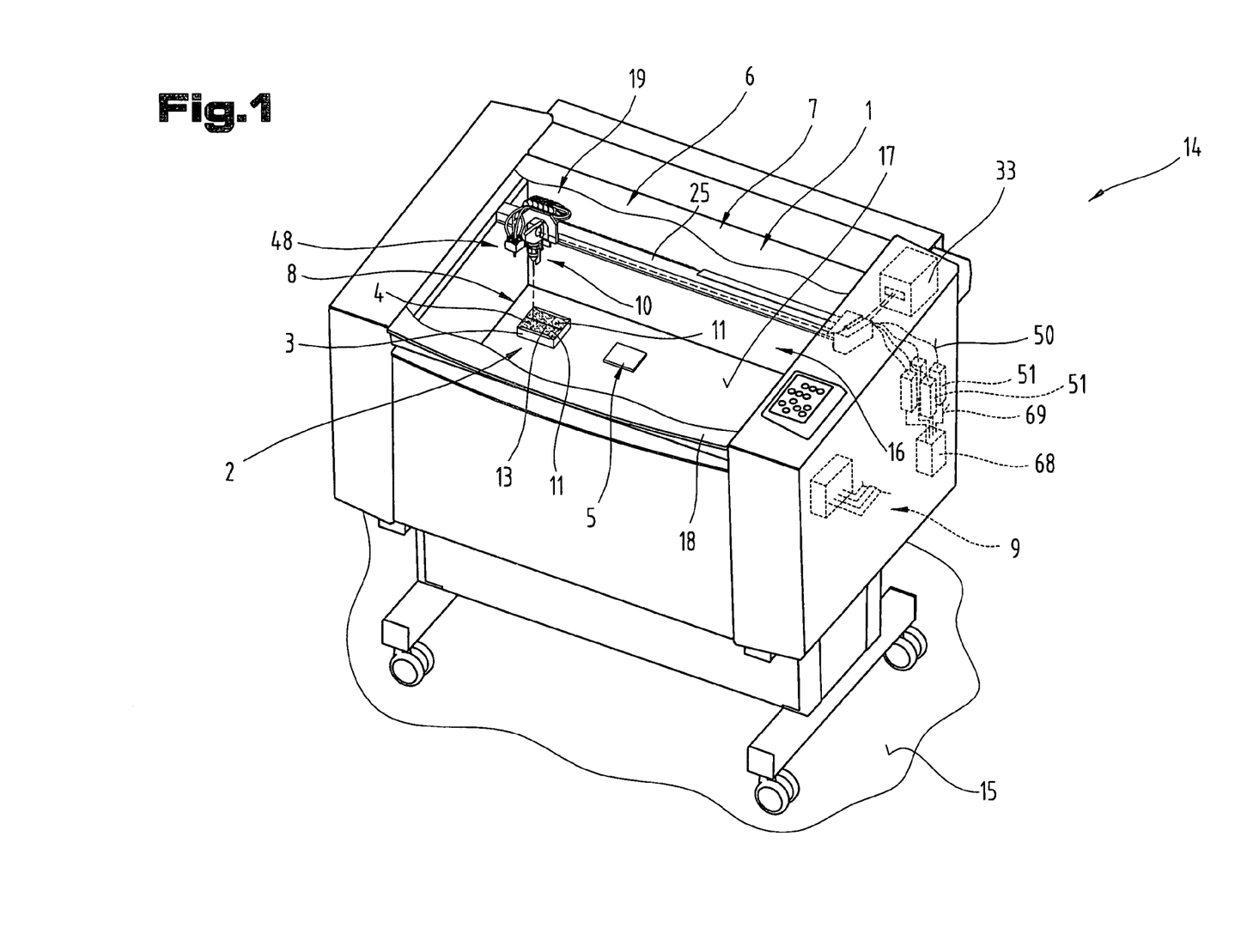
FIG. 1 is a perspective diagram of a processing device proposed by the invention in a production line, seen from an angle.

FIG. 1 shows a processing device 1 proposed by the invention for processing at least composite components 2, comprising at least a support device 3, in particular a stamp pad holder, and a stamp pad 4, which processing device 1, in addition to processing composite components 2, may also be used to produce or process other workpieces, such as stamp plates 5, for example, in particular stamp plate blanks, the parts to be processed also being referred to as workpieces hereafter.

In order to process workpieces, the processing device 1 has at least one material-removing unit 6 and a handling unit 7. Workpieces disposed on a workpiece holder 8, for example, can therefore be processed by means of the material-removing unit 6, in which case the processing sequence can be controlled and/or regulated by means of at least one control unit 9 which is and/or can be connected to the handling unit 7, and at least one operating head 10 of the material-removing unit 6 can be adjusted, in particular can be moved, on the basis of signals pre-set by means of the control unit 9 with a view to controlling and regulating the handling unit 7, preferably relative to a workpiece holder 8 and the workpiece.

As a result of this embodiment of the processing device 1, it is now possible, as is the case with the embodiment illustrated as an example, for a workpiece to be processed so that material is removed from it by the material-removing unit 6 depending on how the operating head 10 is adjusted or moved. Material is removed in such a way that material is removed from certain regions of the stamp pad 4 of the composite component 2 by the material-removing unit 6 so that the stamp pad 4 is cut into at least two separate pad parts 11, in which case the different pad parts 11 are separated by a dividing gap 13 resulting from the removal of material. This being the case, the dividing gap 13 is preferably produced on the composite component 2 in such a way that the stamp pad 4 has a continuous recess or cut through its thickness and the pad parts 11 are completely separated from one another, as will be described in more detail below and as may be seen from FIG. 4.

The processing device 1 is preferably designed for use with a production system 14 of the type illustrated in FIG. 1. Accordingly, the production system 14 is positioned on a support surface 15 and, in the embodiment illustrated as an example, also has an interior 16, in which the workpieces are process by means of the processing device 1, in particular the material-removing unit 6 and the handling unit 7. In order to accommodate workpieces, a support base 17 is provided in the interior 16 constituting a workpiece holder 8. Naturally, it would also be possible for the workpiece holder 8 to be provided in the form of clamping and/or positioning mechanisms for retaining workpieces in a fixed position, in which case the workpiece holder 8 may be provided in the form of mechanical clamping mechanisms, such as vices for example, or, in order to fix the position, form-fitting positioning frames to accommodate the workpieces. Another option is for the workpiece holder 8 to be placed not in an interior 16 but on any surface suitable for accommodating workpieces.

Production systems 14 of the type illustrated in FIG. 1 are already known from the prior art and will therefore not be discussed in any further detail at this point, FIG. 1 merely showing a preferred embodiment of a production system with which the processing device 1 can be used. The processing device 1 is provided in the form of a modular unit designed to extend an already known production system 14 by means of which the advantage offered by the invention can be achieved.

Figure 2:
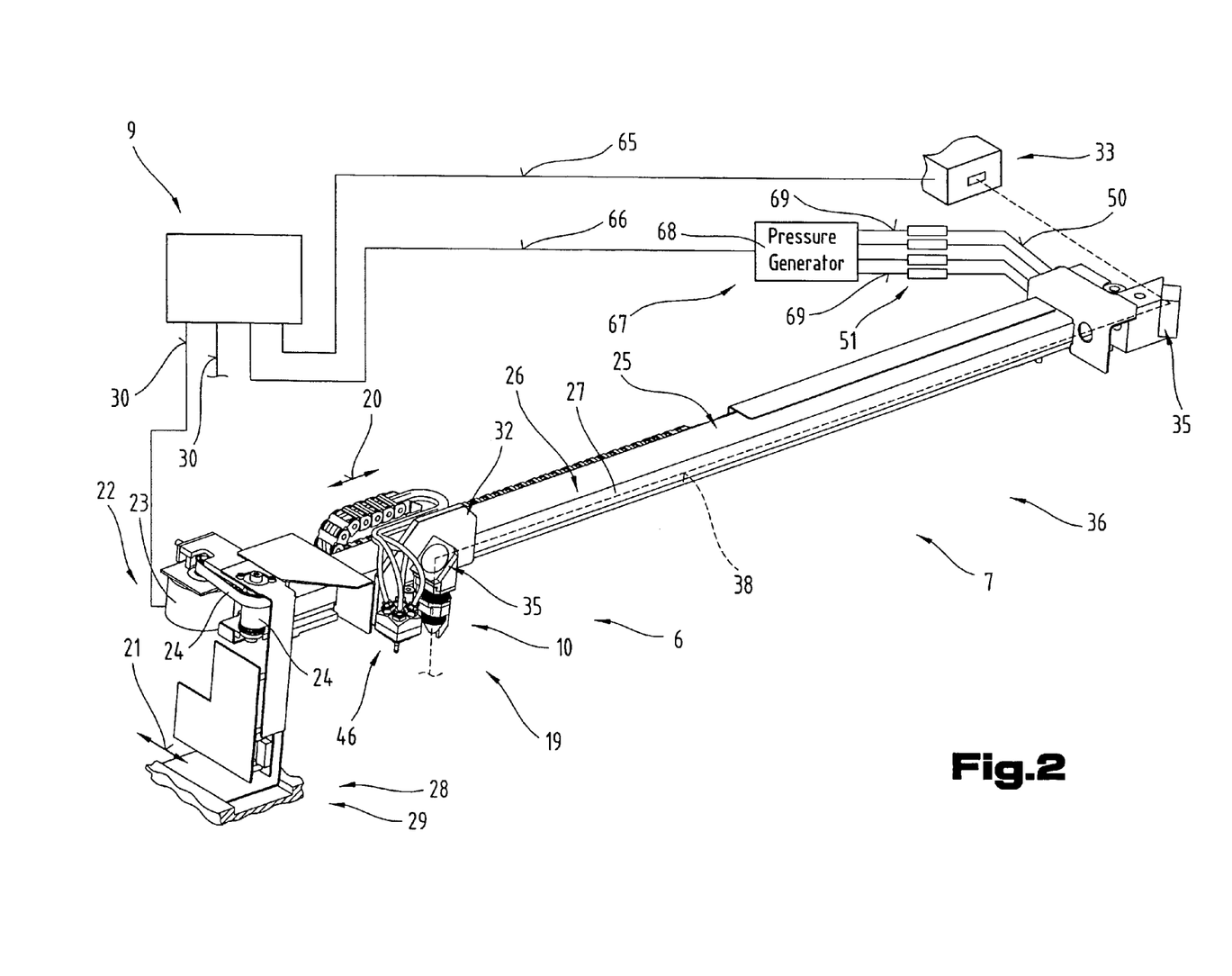
FIG. 2 is a perspective diagram of the processing device proposed by the invention illustrated in FIG. 1, seen from an angle.

FIG. 2 illustrates the processing device 1 with the handling unit 7 and the material-removing unit 6. In this embodiment, at least the operating head 10 is optionally one of several components of the effector unit 19 and co-operates therewith.

The handling unit 7 is designed to displace at least the effector unit 19 at least linearly, preferably along two axes in a Cartesian co-ordinate system, rendering the effector unit 19 displaceable at least in an X direction 20 and a Y direction 21. Accordingly, the effector unit 19 is displaceable in a two-dimensional XY plane extending parallel with the support base 17, for example, and, in order to control and/or regulate the handling unit 7, it is connected to the control unit 9. In order to generate a displacement, the handling unit 7 may have a guide system 26, in particular a linear guide 27, and a drive mechanism 22, which drive mechanism 22 has a rotary motor 23 and transmission elements 24. As illustrated in FIG. 2, the rotating movement produced by the rotary motor 23 is transmitted via the transmission elements 24, provided in the form of belts, to a device for converting a rotating motion into a linear motion, for example to a rack arrangement or a spindle drive assembly, in which case the effector unit 19 is purposely designed as the last moving member of the resultant kinematic chain of motion and is therefore linearly displaceable in the X direction 20 along a support arm 25 by guide system 26 constituting a linear guide 27.

To provide a clearer view, only the drive mechanism 22 for displacing the effector unit in the X direction 20 is schematically illustrated in FIG. 2 and only a fraction of another guide system 28 and drive mechanism 29 for displacing the handling unit 7, in particular the support arm 25, in the Y direction 21 is schematically indicated, it being possible for the drive mechanism 29 and guide system 28 to correspond in principle to those illustrated. In this respect, it should be pointed out that other devices known from the prior art for positioning objects may naturally be used in conjunction with the processing device proposed by the invention, in which case track-controlled or handling units controlled by a system of coordinate points, in particular manipulators with two degrees of freedom, may be used for generating a linear displacement in a plane.

In order to control and/or regulate the movement to be effected by the effector unit 19 in the XY plane, the drive mechanism 22, in particular the rotary motor 23 in the embodiment illustrated as an example here, is connected via a control line 30 to the control unit 9, and another control line 30 may be provided for controlling and/or regulating the drive mechanism 29. Accordingly, the control unit 9 is able to control the handling unit 7 in order to position the effector unit 19 at any point within a possible operating range, preferably in the XY plane, along a cutting path. At this stage, it should be pointed out that, the handling unit 7 may also be designed for displacement within a three-co-ordinate system, in which case it would be possible to obtain a three-dimensional displacement of the effector unit 19 in three directions.

In a preferred embodiment of the material-removing unit 6, only its operating head 10 is displaceably disposed on a retaining unit 32 forming the effector unit 19, in which case the equipment needed to generate the energy for removing material, e.g. kinetic, electrical, thermal energy, need not be disposed on the effector unit 19 and does not need to be coupled with it in displacement, which means that the components which have to be moved by the handling unit 7 may have a low volume and weight. As shown in the embodiment illustrated as an example, this function is advantageously fulfilled using a radiation source 33 to generate an energy beam 34, in particular because this means that the only transmission elements needed to direct the energy to the operating head 10 are deflector mirrors 35 and no other components are needed to transmit energy, whilst the radiation source 33 can be stationary-mounted, for example on a production system 14.

The system used to apply an energy beam 34 is preferably a laser system 36 with a laser head 37 co-operating with the effector unit 19 or disposed on it. Due to its particularly high efficiency, the use of a $CO_2$ laser has proved to be of particular advantage, although it would naturally also be possible to use any type of fixed-body, fluid, semiconductor and gas laser types.

Figure 3:
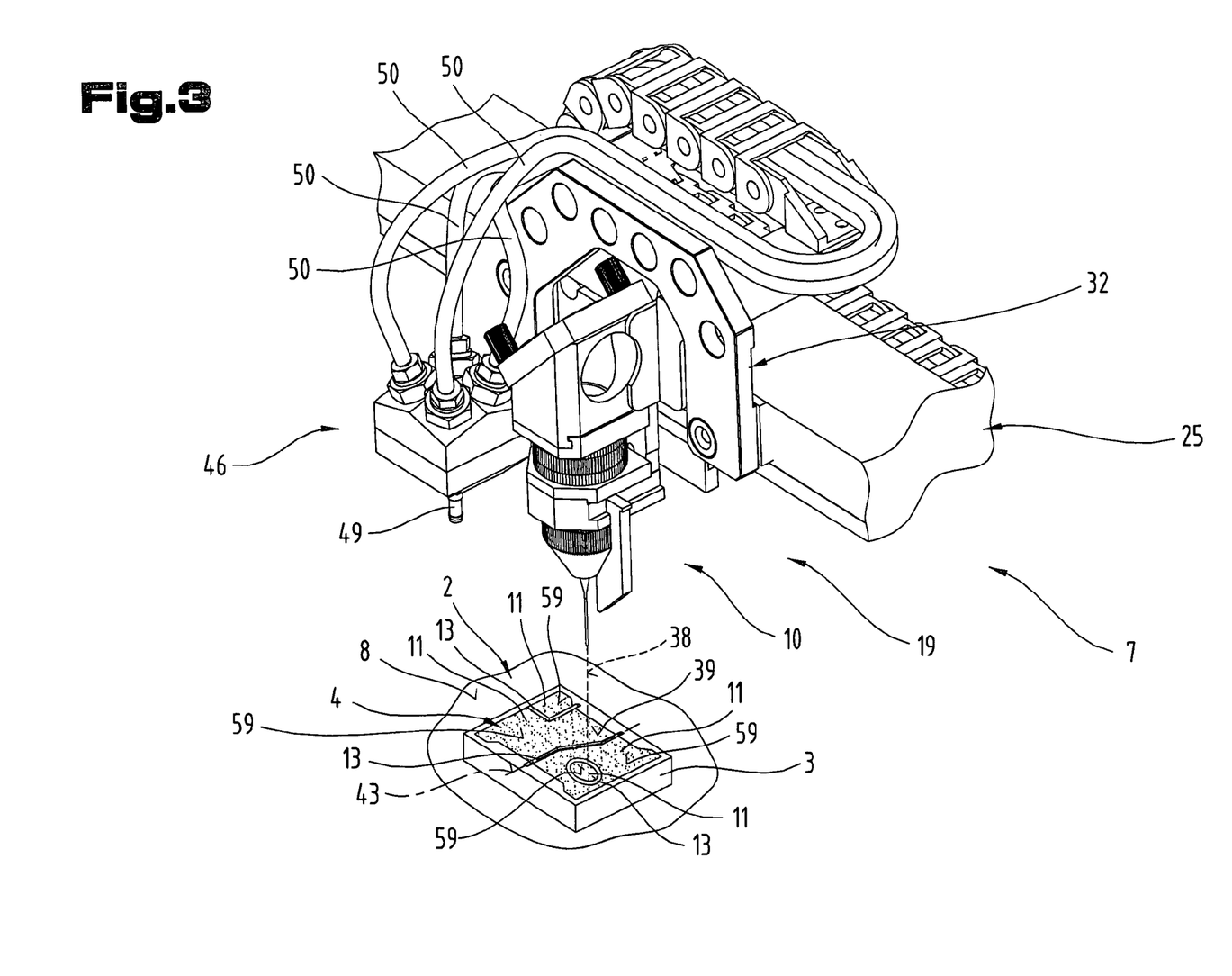
FIG. 3 is a detailed diagram of the processing device illustrated in FIG. 2, seen from an angle.
Figure 4:
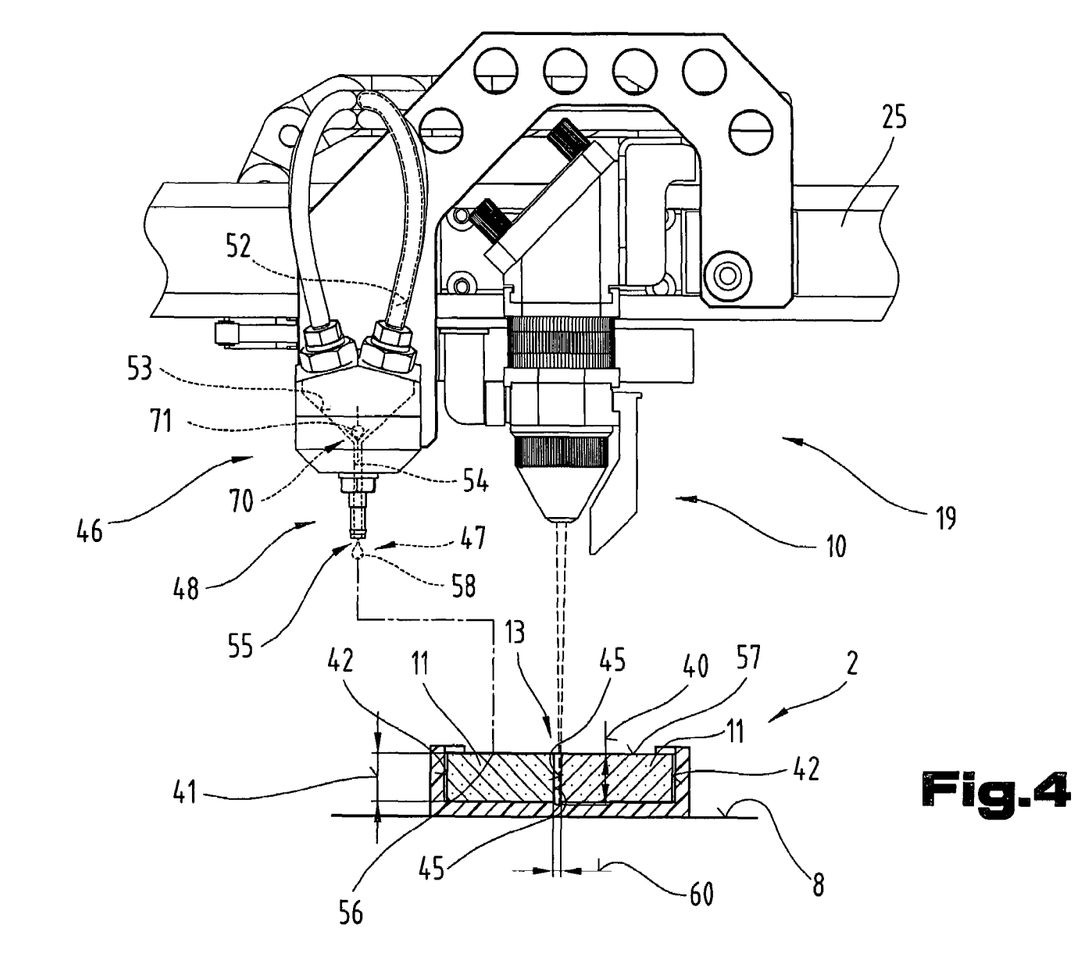
FIG. 4 is a detailed diagram showing the processing device illustrated FIG. 3 in detail from a side view with a composite component illustrated in section.

The laser radiation 38 generated by the radiation source 37 is transmitted via the deflector mirrors 35 to the laser head 37 so that the laser beam 38 emitted from the laser head 37 in the direction of the workpiece is transmitted to a substantially flat processing surface 39, on a stamp pad top face of the composite component 2 where material is removed (see FIGS. 3 and 4). In a manner known from the prior art, a focussing lens is disposed in the laser head 37 in order to generate a burning point, so that the composite component 2 can be split through a cutting depth 40 by focussing on the burning point within the composite components 2 accordingly, for example on the lowermost point of the cutting depth 40, as illustrated in FIG. 4, so that the stamp pad 4 can be cut through its entire thickness 41 across the resultant dividing gap 13 into several pad parts 11. The cutting depth 40 may essentially be set by controlling the cutting speed, the power and a distance of the burning point from the operating head 10. Since the structure of laser systems 36 is sufficiently well known from the prior art, their structure will not be explained in any further detail here.

In respect of the design of the material-removing unit, it should also be pointed out that, instead of using a radiation source 33 or a laser system 36, other methods of removing material from a workpiece known from the prior art may also be used, in which case it would be possible to use mechanical milling processes, jet cutting process, hot wire cutting processes, etc. To produce the dividing gap 42 in the stamp pad 4, it would also be possible to use severing methods, e.g. cutting, whereby cuts made along the dividing surfaces 45 separate the stamp pad 4 into the pad parts 11, after which the cut part left in the stamp pad 4 is removed in order to produce the dividing gap 42. A mechanical cutting plotter with cutting blades may be used for this purpose, for example.

As may be seen in particular from FIGS. 3 and 4, the stamp pad 4 is cut into several pad parts along cutting lines 43 across the dividing gap 13. In this respect, the cutting lines 43 are not restricted to any particular shape and, as illustrated, may be extend in a circular, arcuate, straight arrangement, etc., on the processing surface 39 of the composite component 2, the cutting lines 43 being set by the control unit 9, and at least the operating head 10, in particular the effector unit 19, is displaced or moved relative to the workpiece holder 8, in particular the processing surface 39 of the composite component 2, following, the cutting lines 43, in order to remove material along the cutting line 43. This displacement or movement of the handling unit 7 and the removal of material by the material-removing unit 6 is controlled and/or regulated by the control unit 9. Consequently, material can be removed or detached from a processing zone of the stamp pad 4 continuously across the thickness 41 of the stamp pad 4 along the cutting lines 43 in order to produce the dividing gap 13, thereby forming on the pad parts 11 respective oppositely lying cut surfaces 45 spaced at a distance apart from one another by the dividing gap 13, so that the pad parts 11 are completely separated from one another by peripheral surfaces 44 and cut surfaces 45 around the periphery. Along the cut surfaces 45 on the pad parts 11 bounding them, the dividing gaps 13 are bounded in a virtually fluid-proof arrangement with respect to the stamping inks contained in the pad parts 11, thereby preventing any admixing of different types of stamping ink.

During this cutting process, material can also be removed on the support device 3, in particular if retaining projections extend in the direction of the stamp pad 4 in order to retain it on the support device 3 (see composite component 2 in FIG. 3), to enable a complete separation of the pad parts 11.

To enable stamping ink to be delivered or applied to the stamp pad parts 11, the processing device 1 has an ink dispenser unit 46, which is designed to dispense stamping ink 47, in particular inking fluids, as and when required. As in the case of the embodiment illustrated as an example here, the ink dispenser unit 46 has at least one dispensing unit 48 with at least one dispenser nozzle 49.

As in the embodiments illustrated as examples, the output side of the ink dispenser unit 46 preferably has at least one dispensing unit 48 for stamping ink 47 and an ink delivery system, in particular one or more fluid lines 50 for delivering stamping ink 47 to the dispensing unit 48 and one or more ink container 51 (see FIG. 1). Accordingly, stamping ink 47 is delivered to the dispenser nozzle 49 via the fluid lines 50, the flow passages 52 of which, on the input side, are in flow connection with an interior for accommodating stamping ink 47 in the ink containers 51, whilst at the output side they have a flow connection to a housing chamber 53 connected to a discharge passage 54 of the dispenser nozzle 49, so that stamping ink 47 can be discharged through an outlet orifice 55, in particular the discharge passage 54. The outlet orifice 55 is therefore able to deliver stamping ink 47 via one or more fluid lines 50 with a flow connection to the outlet orifice 55 and the housing chamber 53 for different types of stamping inks 47.

The fluid lines 50 may have specific flexible material properties enabling them to deform and in particular may be made from elastic synthetic material so that the fluid lines 50 can be run in a manner known from the prior art in a crawler-type line carrier or a line guide system, as partially illustrated in FIGS. 2 to 5, in a flexible and compact bundle to the effector unit 19, in particular to the dispensing unit 48.

Naturally, it would also be possible for the outlet orifice 55 to be provided directly on the ink container 51, for example, and the ink container 51 could be designed to dispense the stamping ink 47 directly, in which case they will co-operate with the effector unit 19. The at least one dispensing unit 48 is preferably disposed on the effector unit 19, in which case, although this embodiment is not illustrated, the dispensing unit 48 and the operating head 10 can be displaced independently of one another and several effector units co-operate with the processing device 1.

The advantage of the possible design of the ink dispenser unit 46 with a dispensing unit 48 described above is that only the dispensing unit 48 of the ink dispenser unit 46 is a spatially displaceable element and the ink container 51 is then disposed in a stationary arrangement on a production system 14 by preference (see FIG. 1). The effector unit 19 can be displaced by means of the control unit 9 on the basis of a controllable pre-set desired value in at least the XY plane.

In the more especially preferred embodiments illustrated, the effector unit 19 incorporates the dispensing unit 48 and operating head 10, which are connected to the retaining unit 32, in particular are mounted on it so as to be prevented from moving. The retaining unit 32 is therefore designed to be displaceable in the manner described above by means of the handling unit 7, preferably in an XY plane. By adopting this design of effector unit 19, all the components acting on the composite component 2 or a workpiece can be integrated, in particular the operating head 10 and effector unit 19, making the handling of these components compact and easy by fitting a unit on the effector unit 19 which is as compact as possible and simple.

In view of the fact that the dispensing unit 48 for stamping ink 47 is displaceable in at least the XY plane, stamping ink 47 can be delivered to application points 56 on the pad top face 57 of the stamp pad 4 or pad parts 11. Stamping ink 47 is preferably applied or supplied to the pad parts 11 by means of ink drops 58, which are dripped onto one or more ink application points 56 on the pad top face 57, in which case the outlet orifice 55 of the dispenser nozzle 49 is positioned substantially vertically above an ink application point 56 on the pad part 11 so that an ink drop 58 can then be discharged, in other words at least the dispenser nozzle 49, in particular the outlet orifice 55, of the ink dispenser unit 46 is positioned above the corresponding pad part 11 by means of the handling unit 7 in readiness for dispensing stamping ink 57 to ink application points 52. Accordingly, stamping ink 47 can be dispensed in a specific quantity and uniformly onto the pad parts 11, as will be described in more detail below.

In order for the composite component 2 to be processed by the processing device 1, the following preferred process sequence may be used, during which material is removed along the cutting lines 43 by the material-removing unit 6, in particular the laser system 36, to produce dividing gaps 13 so that the stamp pad 4 is cut in to several individual pad parts 11. Once the stamp pad bas been cut into the pad parts 11, each of the pad parts 11 can be provided with stamping ink 47 by means of the ink dispenser unit 46, for which purpose it is preferable to apply different types of stamping inks, in particular differently coloured stamping inks 47, on different pad parts 11, thereby producing a stamp pad 4 with regions formed by the different pad parts 11 in which different types of stamping ink 47 are stored. The stamp pad 4 is preferably of a design known from the prior art and is designed accordingly to accommodate or store stamping ink 47 and, when the stamp pad 4 makes contact with the pad top face 57, to dispense or ink the corresponding object for example, in particular a stamp plate 5.

Consequently, it is possible, for the first time, to produce a multi-coloured stamp pad 4 by means of a processing device 1 on an automated basis without the need for re-clamping routines or tool changing work, whilst simultaneously being able to set the number, shape and nature of the stamping inks 47 to be stored by the pad parts 11.

In order to set up a production process to be run by the processing device 1 that is as automated and automatic as it can be, at least two surface part-regions 59 are set, preferably on the pad top face 57, by means of the control unit 9 co-operating with the processing device 1, thereby setting the cutting lines 43 in the mutually adjoining surface part-regions 59 along which material will then be removed. The surface part-regions 59 thus correspond to the surface portions on the pad-top face 57, through which different types of stamping ink 47, in particular differently coloured stamping ink, will be dispensed. Once these surface part-regions 59, in particular differently coloured surface portions, have been set, the cut is made in the pad parts 11, and—as illustrated in FIG. 4—the cut surfaces 45 of the dividing gaps 13 are preferably produced so that they stand essentially vertically on the pad top face 57 and a distance 60 between the cut surfaces 45 is kept as short as possible.

By preference, the distance 60 may be approximately 1 mm, for example between 0.1 mm and 2 mm, and this distance 60 of the cut surfaces 45 may optionally be produced by several adjacent cutting lines 43. This being the case, the adjacent cutting lines 43 are spaced at a distance apart so that the desired distance 60 is achieved between the cut surfaces 45 of the dividing gap 13 once the cutting processes along all the cutting lines 43 have been completed. For example, three cutting lines 43 may be disposed at a distance of approximately 0.3 mm from one another in order to obtain a distance 60 of approximately 1 mm after the cutting process. The distance 60 should be large enough to prevent or largely prevent any admixing of stamping inks 47 from different pad parts 11 due to the spacing. The advantage of removing the smallest possible amount of material across the distance 60 is that only a small amount of the surface of the pad top face 57 is removed and virtually the entire pad top face is suitable for dispensing stamping ink, for example more than 90% of the pad top face 57. It would also be possible to remove part-regions corresponding to a region of the pad top face 57 with a large surface area on the stamp pad 4.

Figures 6, 7:
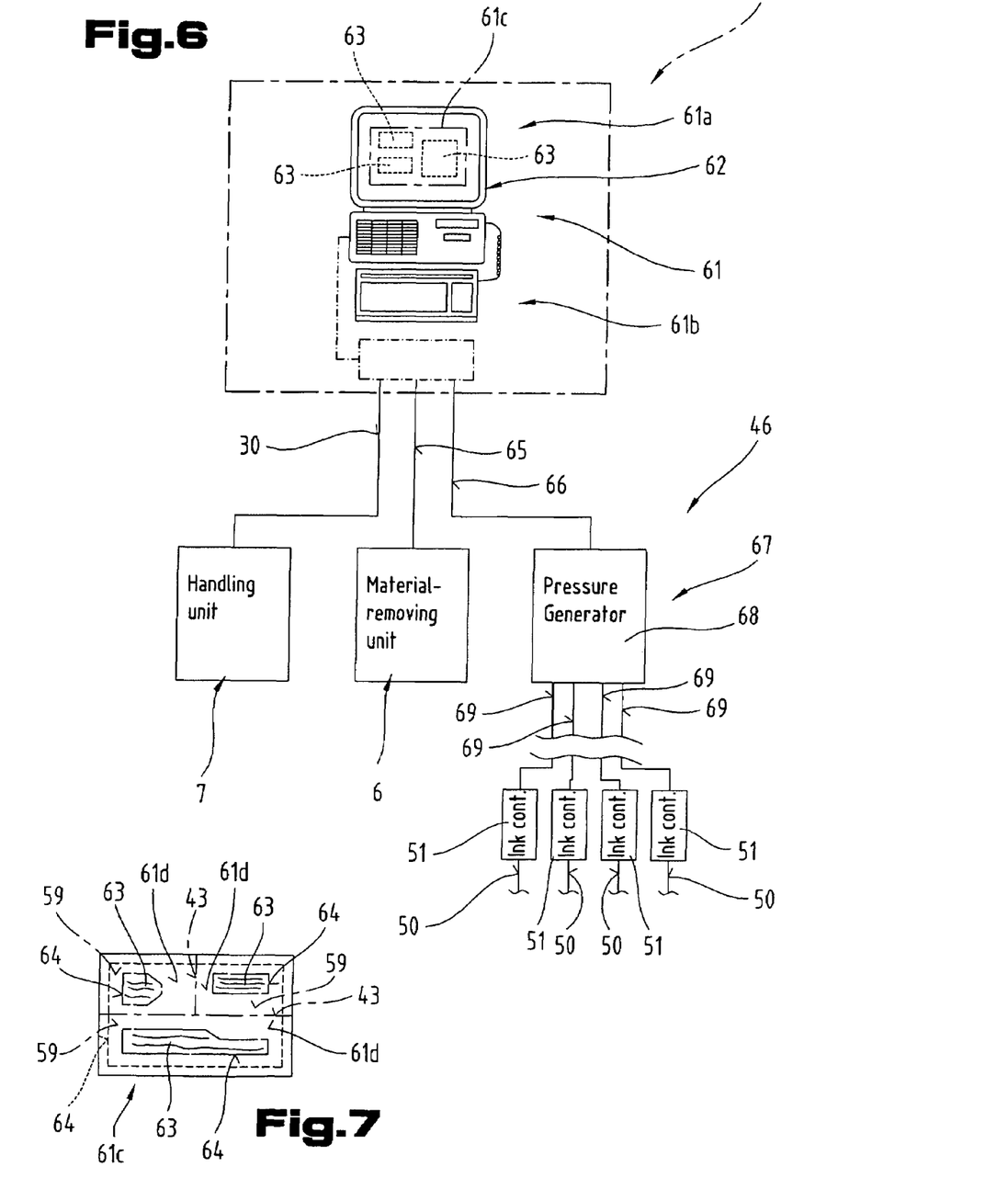
FIG. 6 illustrates one possible embodiment of a structure for controlling and automatically controlling the components of the processing device proposed by the invention, shown in a schematic block diagram.
FIG. 7 is a simplified diagram of a layout of a stamp plate element and stamp pad which can be set up and produced by means of the processing unit.

As illustrated in FIGS. 2 and 6, the control unit 9 co-operates with an input and/or output device 61 or the control unit 9 is part of the input and/or output device, in which case the input and/or output device 61 is preferably a computer unit 62, in particular a personal computer or microprocessor controller. The breakdown into surface part-regions 59 on the pad top face 57 can be set up in an easy and user-friendly manner by means of this input and/or output device 61 because a diagram 61c, in particular a stamp plate 5, is displayed on an output unit 61a, in particular a monitor, and the diagram 61c can be sub-divided into different part regions 63 by means of an input unit 61b.

In a highly simplified format, FIG. 6 illustrates the principle underlying the structure of a control unit 9 together with the components of the processing device 1, whilst FIG. 7 shows an example of a stamp plate layout schematically illustrated by the diagram 61c on an input and/or output device 61.

This division into part regions 63 can be produced by fixing engraved patterns on a diagram 61c displaying a stamp plate bottom face, it being possible for the engraved patterns to be of any freely selectable shape, and the colour to be printed using the finished stamp plate 5 or stamp pad 4 engraved pattern can be fixed by means of an appropriate engraved pattern entered at the input and/or output device 61, in other words the layout of a multi-coloured stamp can be defined.

To provide a clearer understanding, FIG. 7 illustrates a stamp layout of this type displayed by a diagram 61c, in which the different cutting lines 43 for separating the stamp pads 4 into the pad parts 11 and the cutting lines 64 for separating the part regions 63 or the stamp plate 5 are applied to a stamp plate blank. By preference, all of the cutting lines 5, 64 are set automatically, once the engraved patterns and the inks to be printed by it have been individually defined on the displayed stamp plate 5 by an operator and/or a previously set division of engraved patterns loaded from a memory for re-use.

In order to produce the pad part, surface part-regions 59 are determined by the control unit 9, in particular the computer unit 62, on the basis of the fixed part regions 63 or engraved patterns on the diagram 61c and the pad top face 57 is sub-divided.

On the basis of the fixed part-regions 63, in particular engraved patterns, on the input and/or output device 61, in particular the diagram 61c, a stamp plate 5, for example a stamp plate blank, can now be processed, whereby the material removing device 6, in particular the laser system 36, produces engravings in a known manner to produce the stamp plate 5, for example using an engraving process known from the prior art.

Preferably, depending on the number and shape of the part regions 63 or engraved patterns, in other words a stamp layout set at the input and/or output device 61, the surface part-regions 59 or cutting lines 43 can be imparted to the stamp pad 4 by means of the control unit, after which the stamp pad 4 is separated into the pad parts 11. The various pad parts 11 are preferably then provided with different types of stamping ink 47 depending on colour attributes in the part regions 63 or the engraved patterns set at the input and/or output device 61, and in another process step, an engraved stamp plate 5 can be finished in a controlled manner by means of the control unit 9 on the basis of parameters pre-set at the input and/or output device 61.

In order to process stamp plates 5, the part regions 63 in which the engraved patterns, in particular a text, character, graphical character, etc., are disposed can be processed by the material-removing unit 6 so that the part regions 63 are slightly higher than the intermediate regions 61*d* adjacent to them and/or the part regions 63 are preferably moved apart along the cutting line 64. This being the case, it may be that connecting webs are left intact between the part regions 63 and the intermediate regions 61*d* bounding them along the cutting line 64, and the entire stamp plate 5 is cut out, preferably in a rectangular shape the same size as a stamp plate holder or stamp so that the stamp plate 5 can be positioned exactly in a stamp, thereby subsequently enabling an exact and correct ink application to the engravings on the stamp plate 5. After positioning and fixing, in particular adhering, the stamp plate 5 in a stamp, the intermediate region 61*d* extending between the part regions 63 may be taken off the stamp plate holder, during a process to break and remove the connecting webs. This avoids any unintentional admixing of inks in adjacent part regions 63 on the stamp plate 5 because the flat connection of the part regions 63 along which ink might possibly converge has been removed.

The computer unit 62 together with the software means operated on it are configured so that the control and/or regulating processes and computation routines of the control unit 9 can be run by special software means specially designed to control and regulate the processing device 1, in particular a formatting programme and a control programme. To this end, in order to control and/or regulate the material-removing unit 6, the control unit 9 can be connected to the latter via a control line 65 and the handling unit 7 described above can be connected via control lines 30 to the control unit 9, whilst control lines 66 connect the ink dispenser unit 46 to the control unit 9 for control and/or regulation purposes. As illustrated by dotted-dashed lines in FIG. 6, the control unit 9 and/or the processing device 1 may incorporate one or more electronic interfaces, by means of which the processing device 1 proposed by the invention and its components can be connected to the control unit 9 in order to transmit data and/or signals. Consequently, control units 9 that are already in use on production systems 14 can be used with the processing device 1 and set up by means of a software extension on the control unit 9 to enable the latter to control the processing device 1.

In another option, a metering unit 67 of the ink dispenser unit 46 for controlling and regulating the type of stamping ink 47 to be dispensed and/or the quantities of stamping ink 47 to be dispensed from one or more outlet orifices 55 is connected via the control line 66 to the control unit 9, in particular for electronic signal and/or data transmission. This being the case, any devices known from the prior art may be used as ejection mechanisms for the metering unit 67, such as piezoelectric elements, although in the preferred embodiment illustrated, the metering unit 67 is provided in the form of a pressure generator 68.

Consequently, a force can be exerted by the metering unit 67 at least in the region of the discharge passage 54 on at least proportional quantities of stamping ink 57, causing ink drops 58 to be ejected from the outlet orifice 55. The pressure generator 68 preferably has an active pneumatic connection via lines 69 to the ink containers 51 so that an over-pressure can be generated at least briefly in the ink container 51 and/or the flow passages 52 of the fluid lines 50, causing stamping ink 47 to be ejected from the outlet orifice 55.

Another possibility is to provide a shut-off element 70, in particular a check valve 71, preferably in the region of the discharge passage 54 and/or in the flow passages 52—see FIG. 4—which moves into a position which provides a fluid-proof seal in the discharge passage 54 at ambient pressure or at a negative pressure, in particular a pressure lower than a release pressure needed to open a shut-off device to provide a passage, in the flow passages 52 or the housing chamber 53, and when an over-pressure is applied, for example, moves into a releasing position allowing fluid to pass so that stamping ink 47 or ink drops 58 can be dispensed.

Stamping ink 47 is preferably applied to the pad parts 11 on the basis of several ink application points 56 on the pad top face 57 by means of the dispensing unit 48, which is moved alongside a grid pattern of ink application points and ink drops 58 containing one or more quantities of optionally different fluid are dispensed on the basis of control signals pre-set in the control unit 9 and forwarded to the metering unit 67. By applying ink drops 58 to the pad top face 57 in this grid or matrix pattern, preferably the same quantities of ink are essentially stored in the different regions of the pad parts 11 so that when the pad top face 57 makes contact by means of a stamp plate 5, ink can be applied to it uniformly enabling stamp prints to be produced with a uniform colour intensity.

Figure 5:
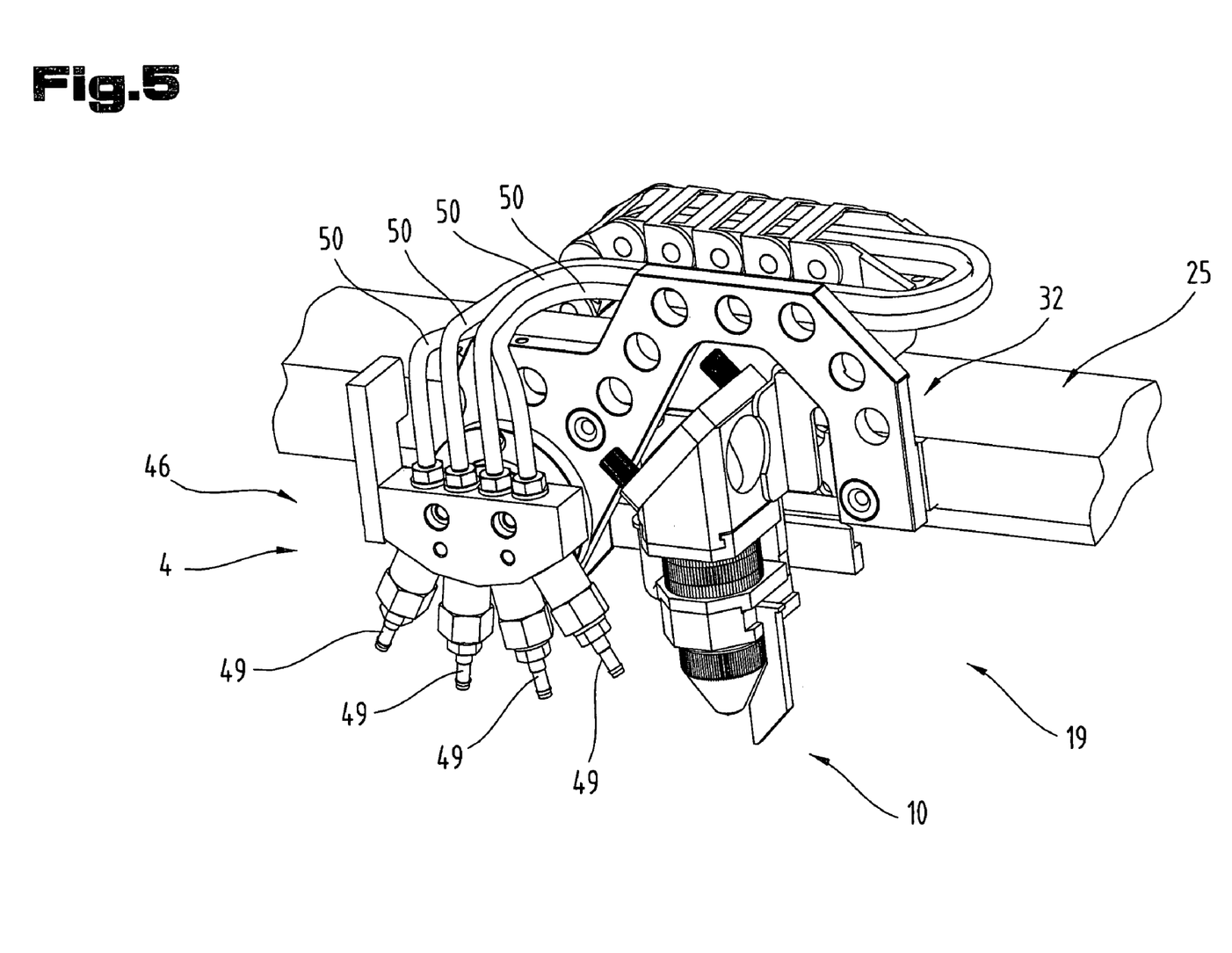
FIG. 5 a detailed diagram showing another embodiment of a processing device, seen from an angle.

FIG. 5 also illustrates another particularly preferred embodiment with an ink dispenser unit 46. In this case, the dispensing unit 48 has several dispenser nozzles 49, each of which dispenser nozzles 49 preferably applies ink to the stamp pad 4 but each applying a separate type of stamping ink 47, and the dispenser nozzles 49, in particular their outlet orifices 55, expediently each have a flow connection to a flow passage 52 of a fluid line 50. The advantage of this is that there can be no undesirable admixing of different types of stamping inks 47, obviating the need to provide any additional means for keeping the types separate, for example in the housing chamber 53 illustrated in FIG. 4.

Another possibility worth mentioning is one in which several fluid lines 52 for different types of stamping inks 47 with a flow connection to a housing chamber 53 of a dispenser nozzle 49 may be used to produce an intentional admixing of different metered quantities of basic colours, for example red, green and blue, which means that by mixing stamping inks in specific proportions, in particular by additive colour mixing, colours from the entire colour spectrum or colour palette of the RGB, CMYK colours, etc., can be applied to the pad parts.

After producing the dividing gaps 42, it is also possible to provide them or fill them with a separating material, to provide a mutually sealed, reliable separation of the different pad parts 11. The separating material can be dispensed from a displaceable dispensing unit on the effector unit 19, for example, in which case control and/or regulation of the dispensing unit and the approach to the filling process may be based on the same systems as those described above for applying the stamping ink. The separating material might be adhesive, sealing compound, etc., of a type known form the prior art. Once the dividing gap 42 has been filled with the separating material, the ink may be applied to the pad parts 11.

The embodiments illustrated as examples depict possible design variants of the processing device 1 but it should be pointed out at this stage that the invention is not restricted to the design variants specifically illustrated here and instead, various combinations of the individual design variants are possible and these different options lie within the scope of the person skilled in this technical field on the basis of his background knowledge. All conceivable design variants are possible on the basis of combinations of individual details from the embodiments described and illustrated and fall within the protective scope of the invention.

For the sake of good order, it should finally be pointed out that in order to provide a clearer understanding of the structure of the processing device 1, it and its constituent parts are illustrated to a certain extent out of scale and/or on an enlarged scale and/or on a reduced scale.

The independent solutions proposed by the invention and the underlying objectives may be found in the description.

Above all, the individual embodiments of the invention illustrated in FIGS. 1; 2, 3, 4; 5; 6; 7 may be construed as independent solutions proposed by the invention. The associated objectives and solutions may be found in the detailed descriptions of these drawings.

LIST OF REFERENCE NUMBERS

1 Processing device
2 Composite component
3 Support device
4 Stamp pad
5 Stamp plate
6 Material-removing unit
7 Handling unit
8 Workpiece holder
9 Control unit
10 Operating head
11 Pad part
13 Dividing gap
14 Production system
15 Support surface
16 Interior
17 Support base
18 Cover
19 Effector unit
20 X direction
21 Y direction
22 Drive mechanism
23 Rotary motor
24 Transmission element
25 Support arm
26 Guide system
27 Linear guide
28 Guide system
29 Drive mechanism
30 Control line
32 Retaining unit
33 Radiation source
34 Energy beam
35 Deflector mirror
36 Laser system
37 Laser head
38 Laser beam
39 Processing surface
40 Cutting depth
41 Thickness
43 Cutting line
44 Peripheral surface
45 Cut surface
46 Ink dispenser unit
47 Stamping ink
48 Dispensing unit
49 Dispenser nozzle
50 Fluid line
51 Ink container
52 Flow passage
53 Housing chamber
54 Discharge passage
55 Outlet orifice
56 Application point
57 Pad top face
58 Ink drops
59 Surface part-region
60 Distance
61 Input and/or output device
61a Output unit
61b Input unit
61c Diagram
61d Intermediate region
62 Computer unit
63 Part-region
64 Cutting line
65 Control line
66 Control line
67 Metering unit
68 Pressure generator
69 Line
70 Shut-off element
71 Check valve

The invention claimed is:

1. Method of processing, by machine, composite components comprising at least a support device and a stamp pad by means of a processing device, whereby, in order to process the composite component at least one operating head of a material-removing unit and the composite component are moved relative to one another by means of a handling unit controlled and/or regulated by a control unit and material is removed from the composite component by the material-removing unit, wherein the stamp pad of the composite component which is at least partially joined to the support device is divided into several pad parts spaced at a distance apart from one another by means of a dividing gap by the material-removing unit and wherein at least one effector unit, which preferably incorporates at least one dispensing unit of the ink dispenser unit and the operating head of the material-removing device, can be displaced and positioned by means of the handling unit.

2. Method as claimed in claim 1, wherein at least one cutting line is defined on a processing surface of the composite component by means of the control unit, and the stamp pad is split into the pad parts along the cutting line.

3. Method as claimed in claim 1, wherein material is continuously removed across a thickness of the stamp pad, preferably along the cutting line, in order to form the dividing gap and a composite component with non-connected pad parts is thus produced.

4. Method as claimed in claim 1, wherein once the stamp pad has been cut into several pad parts, it is preferably provided with stamping ink or inking fluids by means of the ink dispenser unit.

5. Method as claimed in claim 4, wherein the pad parts are provided with differently coloured stamping inks or inking fluids.

6. Method as claimed in claim 4, wherein ink is dispensed by the ink dispenser unit in the form of ink drops, which are dripped through one or more outlet orifices in the direction of at least one application point on one of the pad parts.

7. Method as claimed in claim 4, wherein several application points of a pad top face of the stamp pad are fixed or pre-set by the control unit, in a grid pattern.

8. Method as claimed in claim 4, wherein different types of stamping ink for the different pad parts are dispensed respectively via different outlet orifices, each with a flow connection to separate housing chambers in stamping ink containers and/or different types of stamping inks for the different pad parts are dispensed via a single outlet orifice which can be connected to several different housing chambers in stamping ink containers for different stamping ink.

9. Method as claimed in claim 4, wherein several differently coloured stamping inks are mixed and different types or colours of stamping inks are created in readiness for application to the pad parts by a process of mixing specifically metered quantities of stamping inks.

10. Method as claimed in claim 4, wherein at least the outlet orifice of the ink dispenser unit is positioned at different application points in order to dispense ink, preferably at grid points.

11. Method as claimed in claim 4, wherein ink is applied in pulses to the application points by means of one or more ink drops.

12. Method as claimed in claim 4, wherein the stamping ink is dispensed by a fluid ejection from the at least one outlet orifice by briefly applying a pressure surge, at least in the region of the outlet orifice, preferably in the ink containers.

13. Method as claimed in claim 4, wherein the outlet orifice is sealed to prevent unintentional dispensing of ink by means of a shut-off device which can be switched into a position permitting a passage by applying force and which is preferably in the closed position in the normal state.

14. Method as claimed in claim 1, wherein material is removed by the material-removing unit by energy irradiated from a radiation source.

15. Method as claimed in claim 1, wherein surface part-regions are set and/or can be set by the control unit on the processing surface of the composite component, after which the stamp pad is cut, preferably into the individual pad parts on the basis of these surface part-regions.

16. Method as claimed in claim 15, wherein the cutting line between mutually adjacent surface part-regions along which at least the material-removing unit is moved by the handling unit is fixed by means of the control unit.

17. Method as claimed in claim 1, wherein the support device for the stamp pad and the pad parts on a base plate are scored along the cutting line simultaneously with the cutting process of the stamp pad by the material-removing unit and/or is partially severed at retaining projections in the region of the processing surface.

18. Method as claimed in claim 1, wherein the effector unit or individual components of the effector unit are displaced and positioned in an XY plane by means of the handling unit controlled by the control unit.

19. Method as claimed in claim 1, wherein the surface part-regions are set from an input and/or output device co-operating with the control unit.

20. Method as claimed in claim 1, wherein a diagram of a stamp surface of a stamp plate, is displayed at an output unit of a computer unit such as a personal computer for example, and the diagram is divided into several part regions via an input and/or output device.

21. Method as claimed in claim 20, wherein the part regions are divided by setting several engraved patterns to be formed and applied to the diagram and these engraved patterns are then formed on a stamp plate preferably by means of the material-removing unit.

22. Method as claimed in claim 19, wherein the surface part regions and cutting lines on the stamp pad for cutting the stamp pad into pad parts are fixed depending on the number and shape of the part regions or engraved patterns by means of the control unit.

23. Method as claimed in claim 1, wherein the control and/or regulating procedures and computing routines of the control unit are run by software means.

24. Method as claimed in claim 1, wherein, once the part regions or engraved patterns have been fixed by means of the input and/or output device, the regions or cutting lines are automatically divided by the software means in order to produce the pad parts and/or stamp plate.

* * * * *